July 29, 1969 L. A. BRYAN 3,458,576
REDUCTION OF ARYLNITROALKENES
Filed May 11, 1966
EFFECT OF HEAT TREATMENT OF CATALYST PRIOR TO USE
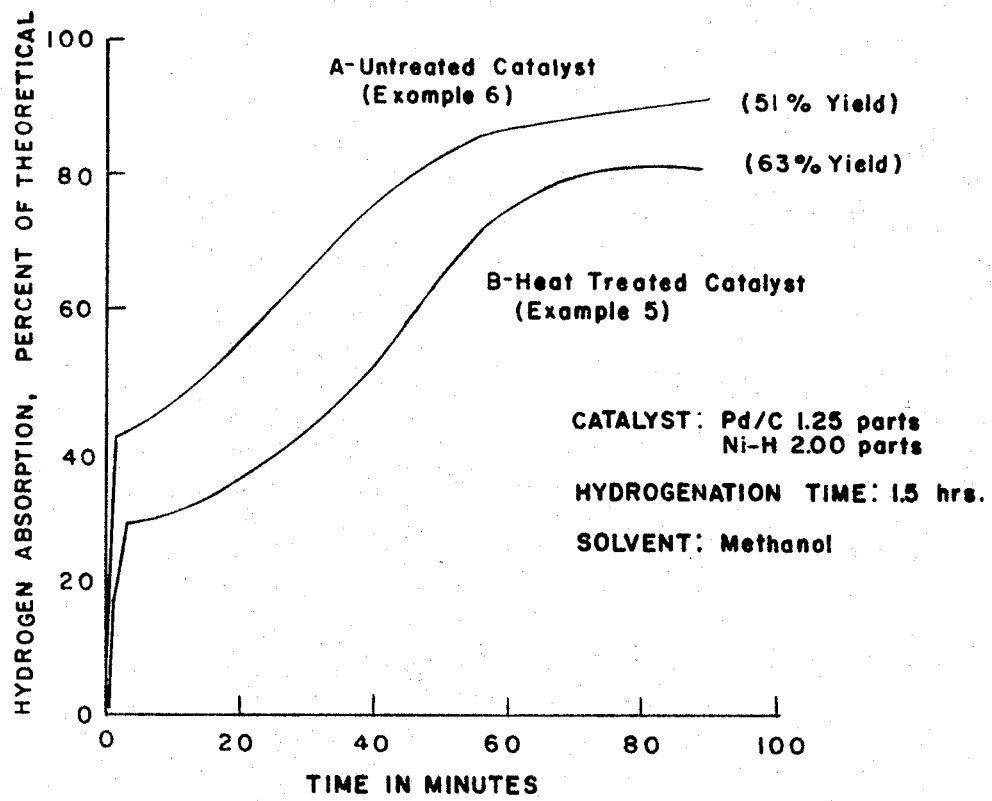
INVENTOR.
Loren A. Bryan
BY
ATTORNEY ated July 29, 1969

3,458,576
REDUCTION OF ARYLNITROALKENES
Loren Aldro Bryan, Elizabethton, Tenn., assignor to Great Lakes Carbon Corporation, New York, N.Y., a corporation of Delaware
Filed May 11, 1966, Ser. No. 549,379
Int. Cl. C07c 87/28, 25/00
U.S. Cl. 260—570.8
10 Claims

ABSTRACT OF THE DISCLOSURE

Phenylnitropropenes are hydrogenated under mild conditions, e.g. at a temperature under 100° C. and a pressure of less than 75 p.s.i.g., in the presence of a slurry of a catalyst in the hydrogenation solvent which has been treated at about 45° C. for about 4 minutes prior to the hydrogenation. Palladium, platinum and mixtures of these metals with non-pyrophoric nickel are the catalysts used.

---

The present invention is concerned with a process for the reduction of certain organic nitro compounds to organic amines. More particularly, it relates to a process for the reduction of arylnitroalkenes to arylaminoalkanes.

There are numerous methods outstanding in the art for reducing nitro groups to amino groups and ethylenic linkages to saturated bonds. When these methods are brought to bear on certain materials such as arylnitroalkenes however, there arise difficulties that have yet to be overcome. For example, cathodic or sodium amalgam treatment have been used to reduce 1-phenyl-2-nitropropene to 1-phenyl-2-aminopropane, a compound commonly known as amphetamine. These particular reductions as taught by Alles, U.S. Patent 1,879,003 have failed to gain wide use. An explanation for this is offered by Susie and Hass, U.S. Patent 2,233,823, who acknowledge that it has been found extremely difficult to effect satisfactory reduction of, e.g., 1-phenyl-2-nitropropene; only low yields are secured by electrolytic reduction and only high molecular weight polymeric products are formed on catalytic hydrogenation. Susie and Hass meet these problems by employing a two-stage reduction which consists in first submitting the arylnitropropene to the reducing action of iron in the presence of water in order to obtain the oxime of the corresponding arylpropanone, then treating this product with high-pressure hydrogen gas, about 1700 p.s.i.g., in the presence of the metal catalysts, e.g., platinum, palladium, or nickel. A 50% overall conversion of the arylnitropropene to the arylaminopropane is obtained in this manner. Pyrophoric nickel has been used as a catalyst with yields of up to 60% of the amine calculated on the nitro-olefin. Tindall proposes this method in U.S. Patent 2,636,901 in lieu of noble metal catalysts which he considers poor prior art for various reasons.

It is an object of this invention to provide a one-step high yield method for reducing arylnitroalkenes to arylaminoalkanes. Another object is to provide a method that requires the use of very moderate pressures. A further object is to avoid the use of easily flammable materials such as pyrophoric catalyst.

These and other objects which will be apparent from the description of the invention, have been accomplished by subjecting the arylnitropropene to the action of hydrogen gas in the presence of a noble metal catalyst or of a mixture of noble metal and non-pyrophoric nickel catalysts, said catalysts having previously been subjected to a mild heat treatment. To carry out this heat treatment, the catalyst is first slurried in the hydrogenation reaction solvent, e.g. methanol. The actual time and temperature conditions employed may be varied to some extent depending on such factors as the boiling point of the hydrogenation solvent and the specific catalyst used. In any case, the prior measure of catalyst inactivation can be achieved by heating the slurry at various temperatures for a period of time inversely proportional to the actual temperature selected. While it is impractical to determine precisely all the possible catalyst, solvent, temperature and time combinations permissible, an idea of the magnitude of these variables can be obtained by reasonable extrapolation of the conditions that have been found most favorable for the class of catalyst involved slurried in common solvents for arylnitropropenes, i.e. temperatures of about 40 to 50° C. and heating period of about 3 to 5 minutes. After heat treatment, the suspension is cooled to room temperature in a cold water bath. It has been found that these simple operations have rather surprising effects which results ultimately in a sensible increase in effectiveness of the hydrogenation reaction. One of these effects consists in a significant change in the hydrogen absorption pattern under reaction conditions. This change is illustrated in the atached single figure which has been drawn from data obtained from Examples 5 and 6. It is characterized by a sharp decrease in hydrogen absorption rate occurring significantly earlier in heat treated catalyst systems than in untreated catalyst systems. After this decrease in rate, the absorption of hydrogen proceeds to a level which, at the end of the reduction, is generally lower with heat treated catalyst than with untreated catalyst. More consistent and probably more important effects of the heat treatment are manifested as an increase in the life of the catalyst and a substantial improvement in its selectivity.

Among the catalysts that can be advantageously treated according to the method of this invention to improve the reduction of arynitropropenes, are such noble metal catalysts as platinum and palladium and mixtures of noble metals with non-pyrophoric nickel. Strangely enough, the benefits of this invention are not available to pure nickel catalysts, although it is evident from the examples that mixed nickel catalysts behave differently when subjected to the practice, provided that a minimum of about .01 part palladium metal is present per per nickel metal. The catalysts can be used without carrier or with a carrier such as finely divided carbon, diatomaceous earth or barium sulfate. The preferred catalyst is palladium deposited on carbon. While this particular material has lead to optimum yields under optimum concentrations, it has been established that optimum yields may be maintained with the use of much less palladium than optimum concentration by substituting non-pyrophoric nickel catalyst for the more expensive palladium catalyst.

The arylaminoalkanes that can be produced by the reduction method of this invention are those derived from the hydrogenation of nitroalkenes of the type $$Ar—CH{=}C(NO_2)—R$$

in which Ar rpresents an aryl group and R, an alkyl group. The arylnitroalkenes may be produced by condensation of aromatic aldehydes and nitroparaffins by any one of a number of known methods.

With respect to the actual operating conditions employed for the reduction, it has been found that some can be varied greatly without exerting any significant effect on the yield of arylaminopropane while others are desirably maintained within relativley narrow limits. The gas pressure in the hydrogenating apparatus may vary from a maximum of under 60 to over 500 p.s.i.g. It is preferable, however, since the method of this invention makes it possible, to operate under pressures of about 75 p.s.i.g. Operating temperatures in the range of 25° C. to 100° C. are permissible. The preferred range depends to some extent on the nature of the solvent vehicle employed. For instance, a range of 25 to 50° C. is preferred for methyl alcohol while better results are obtained with a range of 45 to 80° C. with ethyl alcohol. The time of reaction for these reductions is determined empirically in that the reaction is considered completed at the point where hydrogen absorption has become negligible. The time requirement is believed to be related to many factors among which are temperature, pressure, catalyst concentration, arylinitroalkene substrate concentration, prior history of the catalyst and effectiveness of contact of the hydrogen with the catalyst. High yields have been obtained with reduction times of 1.2 to 3.5 hours, but in a majority of cases 1.5 to 2 hours were sufficient.

A number of specific examples will now be described in order to illustrate the invention in greater detail. The procedures common to all examples will be first described and this will be followed by a table summarizing the variations in materials, conditions and results carried out or observed for each preparation.

A typical procedure, for instance that used for the preparation of Example 1, can be described as follows. The materials employed are 12.5 parts of 1-phenyl-2-nitropropene, 53 parts of absolute ethanol, 1 part of glacial acetic acid, 2.5 parts of 5% palladium on carbon catalyst and enough hydrogen gas to maintain the required pressure in the reactor until the reduction has been completed. All parts and percentages used in the examples are calculated on a weight basis. It should also be noted at this stage that the proportions and quantities just recited are those used in each of the examples mentioned in the table except for the changes noted.

In order to carry out the reduction, the catalyst is first slurried in some of the solvent and that slurry without any further treatment is used for control preparation. In a preparation which actually illustrates the preferred method for performance of this invention, the slurry is heated, as mentioned earlier, to a temperature in the range of 40 to 50° C. and held in that range for 3 to 5 minutes; it is then cooled to room temperature in a cold water bath.

The arylnitropropene, the catalyst slurry, the remainder of the solvent not used for slurrying and the acetic acid are placed in an autoclave which is then sealed, heated where indicated to minimum temperature and pressurized to maximum pressure. While the reaction is proceeding, the autoclave is repressurized with hydrogen gas as necessary, the minimum pressures reached being noted in order to permit calculation of the quantity of hydrogen used. Once the reduction is completed, the contents of the autoclave are removed and filtered to separate the catalyst. The arylaminopropane formed may be recovered from the filtered liquor by a variety of methods. The method selected depends on whether the free amine or one of its salts is desired. In the present case, the amphetamine was isolated in the form of its sulfate by treating the hydrogenation product, amphetamine acetate, with dilute sulfuric acid, distilling off the alcohol, removing the organic impurities by benzene extraction, treating with 10 N sodium hydroxide and extracting again with benzene, boiling the benzene extract briefly to remove ammonia, diluting the extract with denatured alcohol and acidifying to pH 6 with sulfuric acid. The amphetamine sulfate obtained after filtration, washing and drying for 2 hours at 105° C. weighed 9.02 g., an overall yield of 64% based on the phenylnitroalkene. Such a method of recovery of the product from the hydrogenation mixture is fairly standard and well known and shall not therefore be discussed in more detail.

The relevant data necessary to illustrate the invention are summarized in the following table.

TABLE.—REDUCTION OF 1-PHENYL-2-NITROPROPENE [1]

| Ex. No. | Catalysts [2] (parts) | Heat treatment | Temp. range [3] (° C.) | Pressure [4] (p.s.i.g.) | Storage time (days) | Absorbed [5] H₂ (percent) | Selectivity [6] | Yield percent theoretical |
|---|---|---|---|---|---|---|---|---|
| 1 | 5% Pd/C, 2.5 | Yes | 46–67 | 64 | 0 | 72 | 89 | 60 |
| 2 | 5% Pd/C, 2.5 | No | 23–72 | 65 | 0 | 58 | 52 | 34 |
| 3 | 5% Pd/C, 2.5 | Yes | 28–43 | 480 | 0 | 84 | 76 | 65 |
| 4 | 5% Pd/C, 2.5 | No | 26–41 | 500 | 0 | 87 | 63 | 53 |
| 5 | 5% Pd/C, 1.25; Ni-H, 2.0 | Yes | 28–44 | 480 | 0 | 82 | 77 | 61 |
| 6 | 5% Pd/C, 1.25; Ni-H, 2.0 | No | 25–40 | 500 | 0 | 91 | 56 | 58 |
| 7 | Ni-H 4.0 | Yes | 23–56 | 475 | 0 | 75 | 24 | 10 |
| 8 | Ni-H 4.0 | No | 26–75 | 875 | 0 | 90 | 44 | 46 |
| 9 | Ni-R 4.0 | Yes | 23–60 | 54 | 0 | 80 | 45 | 35 |
| 10 | 5% Pd/C, 2.5 [7] | Yes | 48–61 | 54 | 0 | 74 | 88 | 62 |
| 11 | 5% Pd/C, 2.5 | Yes | 45–62 | 55 | 1 | 75 | 83 | 58 |
| 12 | 5% Pd/C, 2.5 | Yes | 45–69 | 69 | 15 | 72 | 67 | 42 |
| 13 | 5% Pd/C, 2.5 | Yes | 50–68 | 61 | 29 | 50 | 64 | 36 |
| 14 | 5% Pd/C, 2.5 | No | 50–64 | 60 | 2 | 54 | 30 | 14 |

[1] All examples in this table carried out with 12.5 parts 1-phenyl-2-nitropropene.
[2] Pd/C, 5% palladium on carbon; Ni-H, 59% nickel on kieselguhr; Raney nickel catalyst, nickel sponge from Ni-Al alloy.
[3] Maximum and minimum temperatures in each run.
[4] Maximum pressures.
[5] Based on phenylnitropropene charged.
[6] The selectivity is obtained by dividing the yield by the hydrogen absorbed and multiplying the fraction obtained by 100.
[7] Englehard, lot 8450, heat conditioned and stored in SDA 3A absolute ethyl alcohol. In all previous examples methyl alcohol was used.

It becomes evident from an examination of the results presented in the table that the conclusion recited earlier on the effect of the heat treatment of catalyst are well supported. A comparison of Examples 1, 10 and 3 with Examples 2 and 4 clearly demonstrates the selectivity and yield improvements to be obtained by the practice of the present invention at moderate hydrogenation pressure. Examples 7 to 9, and especially 7 and 8 show that nickel catalysts are not benefitted by heat treatment but, on the other hand, there can be no doubt that mixtures of a noble metal catalyst with non-pyrophoric nickel can be advantageously heat treated as shown by Examples 5 and 6. Finally, a comparison of Examples 10 to 13 with Example 14 indicates that heat treated catalyst is more stable than untreated catalyst. These last improvements have special value when large scale hydrogenation are effected, such values residing in economy and ease of operation.

It is to be understood, of course, that the above examples are merely illustrative and do not limit the scope of the invention. It will be apparent to those skilled in the art that some of the procedures described can be modified in many respects and that such modifications and equivalents must be considered within the scope of the invention.

What is claimed then is:

1. In a process for the preparation of phenylaminopropanes by the hydrogenation of a phenylnitropropene, the step which consists in subjecting a slurry of the catalyst in the hydrogenation solvent to a mild heat treatment followed by cooling to room temperature before adding said slurry to the hydrogenation mixture; said catalyst having been selected from the group consisting of palladium, platinum and mixtures thereof with non-pyrophoric nickel.

2. The process of claim 1 where the catalyst slurry is heated at a temperature within the range of about 40 to 50° C. for a period of about 3 to 5 minutes and is then quickly cooled to ambient room temperature.

3. The process of claim 1 wherein the hydrogenation is at a pressure of about 60 to 500 p.s.i.g.

4. The process of claim 1 wherein the hydrogenation is carried out at temperatures within the range of about 25 to 100° C.

5. The process of claim 1 wherein the phenylnitropropene reduced is 1-phenyl-2-nitropropene.

6. The process of claim 1 wherein the catalyst used is palladium on carbon.

7. The process of claim 1 wherein the catalyst used is a mixture of palladium on carbon and nickel on Kieselguhr.

8. The process of claim 1 wherein the hydrogenation solvent is selected from the group consisting of methyl and ethyl alcohols.

9. The process of claim 1 wherein the hydrogenation time is within the range of about 1 to 5 hours.

10. The process of claim 7 wherein at least .01 part of palladium is used for each part of nickel.

References Cited

UNITED STATES PATENTS

| | | | |
|---|---|---|---|
| 1,966,478 | 7/1934 | Baur | 260—570.8 X |
| 2,636,901 | 4/1953 | Tindall | 260—570.8 |
| 3,062,884 | 11/1962 | Green | 260—570.8 |
| 3,117,160 | 1/1964 | Holland | 260—570.8 |
| 3,187,046 | 6/1965 | Curtis | 260—570.8 |
| 3,255,248 | 6/1966 | Sussenguth et al. | 260—563 |

ROBERT V. HINES, Primary Examiner

U.S. Cl. X.R.

252—440, 447, 459, 460; 260—645, 689

UNITED STATES PATENT OFFICE
CERTIFICATE OF CORRECTION

Patent No. 3,458,576

August 6, 1969

Loren A. Bryan

It is certified that error appears in the above-identified patent and that said Letters Patent are hereby corrected as shown below:

Column 2, line 4 - cancel "prior" and insert --proper--;
line 43 - cancel "per" (2nd occurrence) and insert --part--.

In the Table, which bridges columns 3 and 4, all of the numbers in the column under the heading "Yield % Theoretica are incorrect and should be cancelled and the following column of numbers substituted therefor:

64%
30%
64%
55%
63%
51%
18%
40%
36%
65%
52%
48%
32%
16%

SIGNED AND
SEALED
MAR 24 1970

(SEAL)
Attest:

Edward M. Fletcher, Jr.
Attesting Officer

WILLIAM E. SCHUYLER, JR
Commissioner of Patents